(12) United States Patent
Mettler

(10) Patent No.: US 9,834,161 B2
(45) Date of Patent: Dec. 5, 2017

(54) ROCK GUARD FOR HIGHWAY VEHICLES

(71) Applicant: Lund, Inc., Buford, GA (US)

(72) Inventor: Dean Edward Mettler, Sturgis, MI (US)

(73) Assignee: Lund, Inc., Buford, GA (US)

( * ) Notice: Subject to any disclaimer, the term of this patent is extended or adjusted under 35 U.S.C. 154(b) by 0 days.

(21) Appl. No.: 15/149,853

(22) Filed: May 9, 2016

(65) Prior Publication Data
US 2017/0001587 A1    Jan. 5, 2017

Related U.S. Application Data

(63) Continuation of application No. 14/295,929, filed on Jun. 4, 2014, now Pat. No. 9,333,929.

(51) Int. Cl.
*B60R 19/52*    (2006.01)

(52) U.S. Cl.
CPC .................... *B60R 19/52* (2013.01)

(58) Field of Classification Search
CPC ......... B62R 19/52; B62R 19/54; B60R 19/52; B60R 19/54
USPC ................................. 180/68.4, 68.6
See application file for complete search history.

(56) References Cited

U.S. PATENT DOCUMENTS

| | | | |
|---|---|---|---|
| 1,453,340 A * | 5/1923 | Druar ..................... | B60K 11/04 165/98 |
| 1,787,035 A * | 12/1930 | Davis ..................... | B60R 19/52 180/68.6 |
| 1,811,527 A * | 6/1931 | Young ..................... | B60R 19/52 180/68.6 |
| 2,054,538 A | 9/1936 | Graves et al. | |
| 3,987,863 A * | 10/1976 | Mittendorf ............. | B60J 1/2005 180/68.6 |
| 4,099,760 A * | 7/1978 | Mascotte ................ | B60R 19/52 224/402 |
| 4,178,034 A * | 12/1979 | Mittendorf ............. | B60K 11/04 180/68.6 |
| D259,873 S * | 7/1981 | Milner ................... | D12/171 |
| D294,707 S | 3/1988 | Cameron | |
| 4,750,549 A * | 6/1988 | Ziegler ................ | B60K 11/085 160/180 |
| 5,067,760 A * | 11/1991 | Moore ................... | B60R 19/52 180/68.6 |
| 5,718,283 A | 2/1998 | Naty et al. | |
| 6,131,681 A | 10/2000 | Nelson et al. | |
| 6,805,389 B1 * | 10/2004 | Schellenberg .......... | B60R 19/52 293/115 |
| 6,810,950 B1 | 11/2004 | Manze, III | |
| 6,830,119 B2 | 12/2004 | Whitworth | |
| 6,854,545 B1 * | 2/2005 | Elwell ..................... | G09F 21/04 180/68.6 |
| 7,028,797 B2 | 4/2006 | White | |
| 7,537,253 B2 | 5/2009 | Rosen et al. | |

(Continued)

*Primary Examiner* — John Walters
(74) *Attorney, Agent, or Firm* — Knobbe Martens Olson and Bear LLP

(57) ABSTRACT

Rock guards can be used to protect parts, such as a radiator, in the engine compartment of highway vehicles. The present disclosure relates to a rock guard that includes a body with self-supporting frameless structure that has a hem and a plurality of mounting points mountable to a structure of the vehicle. The hem comprises a folded section of the material of the body and circumferentially surrounds the body, providing the guard with rigidity.

20 Claims, 4 Drawing Sheets

(56) References Cited

U.S. PATENT DOCUMENTS

| | | | | |
|---|---|---|---|---|
| 9,121,426 B2* | 9/2015 | Jagoda | ............... | F16B 5/0657 |
| 2005/0217911 A1* | 10/2005 | Cheng | ............... | B60R 19/52 |
| | | | | 180/68.6 |
| 2012/0073767 A1* | 3/2012 | Graziano | ............... | B60J 11/06 |
| | | | | 160/368.1 |

* cited by examiner

A-A

ROCK GUARD FOR HIGHWAY VEHICLES

CROSS REFERENCE TO RELATED APPLICATIONS

This application is a continuation of U.S. application Ser. No. 14/295,929 that was filed with the United States Patent and Trademark Office on Jun. 4, 2014. The completed disclosure of U.S. application Ser. No. 14/295,929 is incorporated herein by reference.

TECHNICAL FIELD

The present disclosure relates to protective rock guards for vehicles, such as highway trucks.

BACKGROUND

While driving on highways, highway vehicles, such as trucks, semi-trucks and the like, are often exposed to loose debris, rocks, and other elements that may become airborne due to other vehicles or weather. Rocks and debris that hit the front of the vehicle at a high speed may cause damage to parts of the vehicle behind the front grille, such as parts inside the engine compartment. Often, a radiator is located behind the front grille. Rocks and debris that are small enough to pass through the front grille or travel fast enough to damage the grille can cause damage to the radiator. Some currently available guards typically comprise a wire screen or perforated metal center section with a surrounding support frame. The support frame provides the guard with rigidity, structure, and mounting points that can be used to mount the guard to the vehicle, but also adds weight and manufacturing costs. Improvements are desired. As a rock guard is mounted onto a non-planar surface, the rock guard either needs to be formed to conform to the contours of the surface, or a deformation process is required to conform the rock guard. If the rock guard includes a support frame, the support frame has to be formed to match the contour of the surface the guard will be mounted on, further adding to manufacturing requirements and costs.

SUMMARY

The present disclosure relates to a guard for a vehicle, the guard having a main body with a self-supporting frameless structure extending between first through fourth sides. In one aspect, the main body includes a plurality of mounting apertures and fasteners that allow the guard to be mountable to a structure of the vehicle, such as the vehicle radiator or the front grille. In one aspect, the guard has a plurality of spaced apart openings having a first size, the main body being constructed to allow passage of an air flow stream through the main body openings while preventing passage of objects having a size greater than the first size of the openings.

In another aspect, and instead of utilizing a separate frame, the guard comprises a structural hem to impart structural integrity to the main body. The structural hem is a folded portion of the main body. The structural hem can be provided along each of the first through fourth sides and along at least a majority of the main body outer perimeter. The main body can also include a plurality of mounting apertures configured for mounting the unitary frameless guard to the vehicle, each of the plurality of mounting apertures extending through the main body and being located interiorly of the hem structure. The guard may be constructed of metal, plastic, carbon fiber, or a combination thereof. The main body of the guard may be constructed of metal wire screen.

DETAILED DESCRIPTION

The guard 1 disclosed herein protects the radiator and other parts inside the engine compartment of highway vehicles can be manufactured of various materials, such as metals, plastics, and fabrics. A guard 1 made from a metal material can be more durable than one made of plastic or fabric constructions. The guard 1 allows for air flow to pass through the guard 1 and into the radiator and engine compartment. The present disclosure provides for a guard 1 that has a self-supporting frameless structure, making it faster and more cost effective to produce and more pliable and lighter in weight, making the guard easier to install. Use of the term "frameless" is meant to differentiate over structures having a separate frame assembly or frame pieces that are attached to the main body of a screen that provide structural support to and/or mounting points for the screen. FIGS. 1-4 show exemplary embodiments of the rock guard 1 according to the present disclosure.

Figure 1:
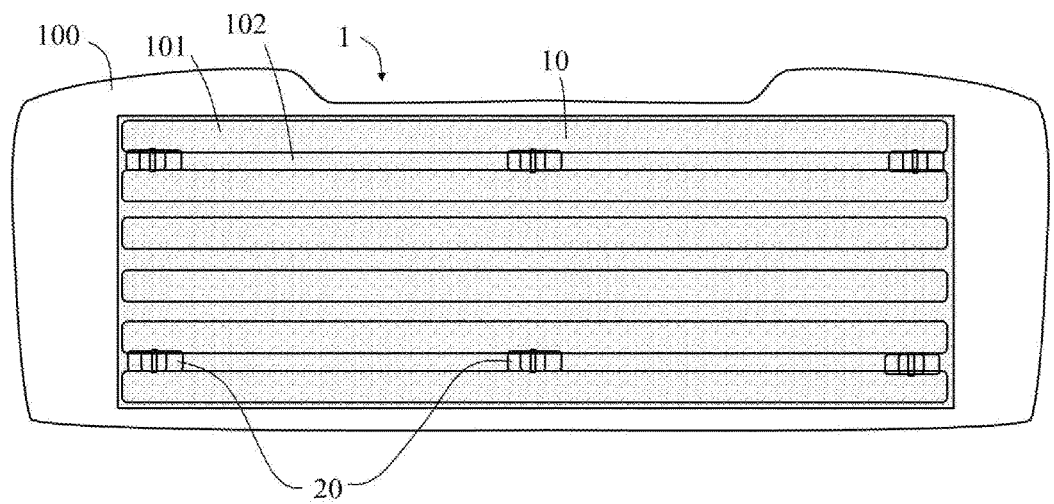
FIG. 1 shows an embodiment of the guard installed on a grille of a highway vehicle.

FIG. 1 shows a schematic view of the guard 1 installed on a grille 100 of a highway vehicle according to an exemplary embodiment. The guard 1 can be installed or mounted by its mounting apertures 11 on a structure of the vehicle, such as the grille 100 (e.g., the front or back-side of the grille 100) of the vehicle. For example, the guard 1 can be configured to be mounted so that it is located between the grille 100 and the radiator of the vehicle. According to embodiments, the guard 1 has a plurality of openings that allow passage of an air flow but that are small enough to prevent rocks and debris that pass through openings 101 in the grille 100 from entering the engine compartment (e.g., the radiator). In exemplary embodiments, the openings in the guard are small enough to prevent rocks or debris with a diameter larger than about 4 mm, 3.4 mm, 2.9 mm, 2.4 mm, 2.0 mm, 1.7 mm, 1.4 mm, or 1.2 mm from going through the guard. According to a preferred embodiment, the openings in the guard will prevent rocks or debris with a diameter larger than about 2.4 mm from going through the guard.

Figure 2:
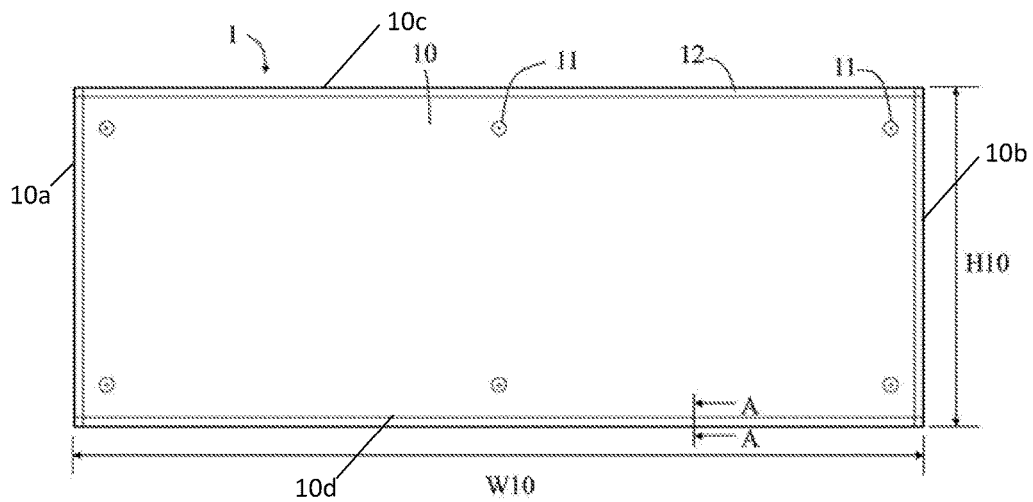
FIG. 2 shows an embodiment of the guard according to the present disclosure.

FIG. 2 shows an embodiment of the guard 1. According to embodiments, the guard 1 has a main body 10 extending between opposite first and second sides 10a, 10b and between opposite third and fourth sides 10c, 10d with a self-supporting frameless structure having a perimeter surrounded by a structural hem 12 and a plurality of mounting apertures 11 mountable to a structure of the vehicle. Various shapes of the main body 10 are possible. For example, the guard 1 can optionally have more than four sides, e.g., five sides, six sides, or eight sides. The guard 1 can also have notched or rounded corners, and can comprise an opening within the guard for allowing a vehicle component (such as a PTO shaft) to pass through the guard.

The main body 10 of the guard 1 may be constructed of a mesh or a perforated material. In exemplary embodiments, the main body 10 is constructed of a wire mesh, such as a metal wire mesh. The metal wire mesh may be of any suitable metal or metal alloy, such as aluminum or steel. The wire mesh may also be coated with a protective coating, such as paint, another metal, or a plastic coating. The wire mesh may be of any mesh size suitable for the purpose. For example, ASTM mesh sizes 5, 6, 7, 8, 10, 12, 14, and 16 may be used. According to a preferred exemplary embodiment, the body 10 of the guard 1 is constructed of ASTM mesh size 8 aluminum wire mesh coated with a protective paint coating. According to alternative embodiments, the main body 10 may be constructed of metal, plastic, fiber glass, carbon fiber, or combinations thereof.

The guard 1 can be sized to fit between the grille 100 and the radiator of the vehicle so that it protects the front of the radiation at least in the areas of the grille openings. The guard 1 can be cut and manufactured to fit to the size and shape of the grille 100 of any vehicle. For example, the main body 10 of the guard 1 may be generally rectangular in shape with a width W10 and a height H10. According to exemplary embodiments, the width W10 can be between about 903.5-911.5 mm, or about 907.5 mm, and the height H10 can be between about 358.5-366.5 mm, or about 362.5 mm. Other shapes are also possible, as seen, for example, in FIG. 5A-5E.

Figure 3:
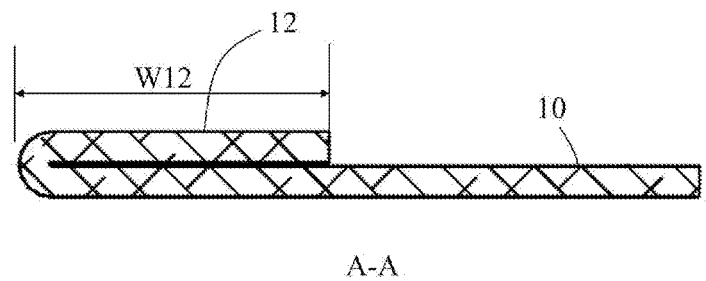
FIG. 3 shows a cross sectional view of an embodiment of the guard of FIG. 2.

As seen in FIG. 2, the main body 10 of the guard 1 is circumferentially surrounded by a hem 12 that extends along at least a majority of the perimeter of the main body 10. In the embodiments, the hem 12 is formed by folding a section of the material of the body 10 over onto itself. FIG. 3 shows a detailed cross sectional view of the hem 12. According to exemplary embodiments, the hem has a width W12 that can be between about 7-50 mm, about 8-30 mm, about 9-15 mm, or about 12 mm. The folded hem 12 gives structural stability to the body 10 of the guard 1 without the need for supporting the main body 10 with a separate frame.

Figure 4:
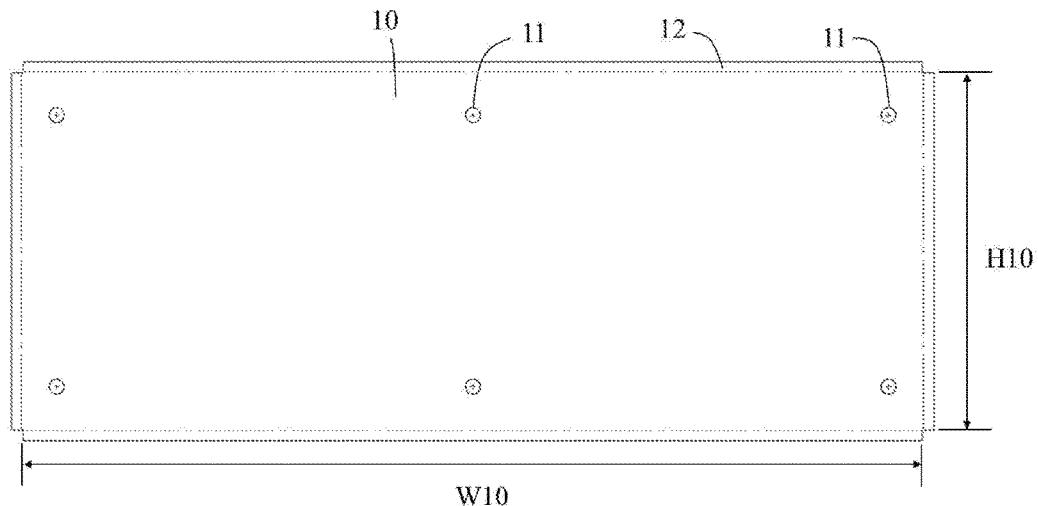
FIG. 4 shows an embodiment of a guard prior to assembly according to the present disclosure.

FIG. 4 shows an exemplary embodiment of material cut to prepare the main body 10. The material for the guard 1 can be cut out as one continuous shape including material for the main body 10 and surrounding hem 12. The material can comprise, for example, metal wire mesh. To prepare the guard 1, the material for the hem 12 is folded over and onto the material for the main body 10. According to a preferred embodiment, the hem 12 extends along at least a majority of the perimeter of the main body 10, or along the whole perimeter of the main body 10. The hem 12 may be further secured onto the main body 10, although the embodiment presented has sufficient rigidity not to require securing of the free end 13 of the hem 12.

The term self-supporting as used in this application is meant to define a structure that is generally capable of maintaining its shape and size without external support, e.g., without a separate supporting frame or other structure. On the other hand, the guard 1 is pliable so that it forms to the structure of the vehicle (e.g., the grille 100) when installed. The guard 1 is capable of following the contour of the grille 100 and thus forming to the curve of the grille 100. According to embodiments, the guard 1 has improved structural stability (e.g., as compared to a simple mesh) supplied by the hem 12 that circumferentially surrounds the main body 10. Together the main body 10 and the hem 12 provide the guard 1 with a semi-rigid quality. In the embodiments the main body 10 is constructed of material having at least a minimum stiffness (e.g., comparable to ASTM size 8 aluminum wire mesh) making it suitable for the purpose. For example, the self-supporting structure of the guard 1 is capable of holding its general shape even when held up by one point only, e.g., by one hand. The guard 1 can also be installed or mounted on a structure of the vehicle by holding the guard 1 in place with one hand and attaching the guard 1 to the structure with the other.

The guard 1 can be attached to the structure of the vehicle by a plurality of attachment mechanisms or fasteners 20. The attachment mechanisms 20 are removably coupled with corresponding mounting apertures 11 on the main body 10 that are inset from the hem 12, and with the structure of the vehicle (e.g., the grille 100). The mounting apertures 11 extend through the main body 10 and can be placed generally along the perimeter of the main body 10. In the exemplary embodiment shown in FIG. 1, the attachment mechanisms 20 extend through the corresponding apertures 11 and clip onto horizontal bars 102 on the grille 100 of the vehicle. The mounting apertures 11 may be sized to fit any suitable attachment mechanism 20, e.g., a clip (as shown in FIG. 1), a Christmas tree fastener, or a nut-and-bold mechanism. The mounting apertures 11 may simply be holes or reinforced holes in the body 10 of the guard 1. According to exemplary embodiments, the plurality of mounting apertures 11 may include from 3-10, or from 4-8 mounting apertures 11. The mounting apertures 11 can be provided with a protective device/member to provide a bearing surface for the attachment mechanism and to hold the weave of the mesh in place, if necessary. The protective member can be held in place, for example, by a hook-and-loop fastener, or any other suitable fastening mechanism.

Figure 5A:
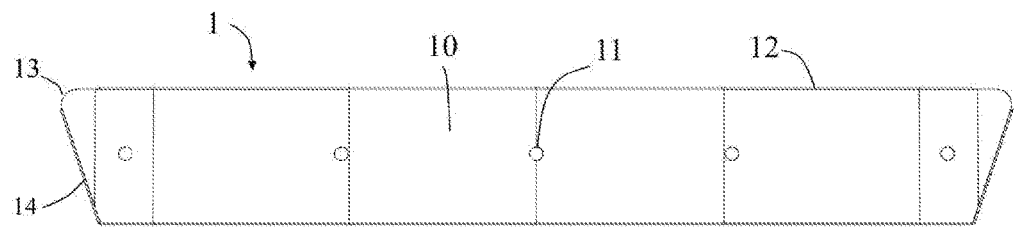
FIG. 5A shows a front view of an embodiment of the guard according to the present disclosure.
Figure 5B:
FIG. 5B shows a bottom view of the guard of FIG. 5A.
Figure 5C:
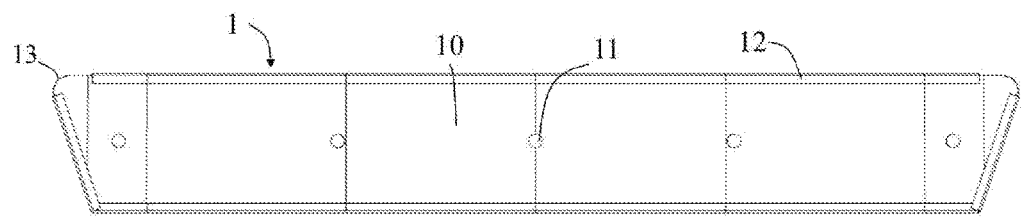
FIG. 5C shows a back view of the guard of FIG. 5A.
Figure 5D:
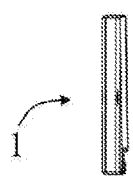
FIG. 5D shows a side view of the guard of FIG. 5A.
Figure 5E:
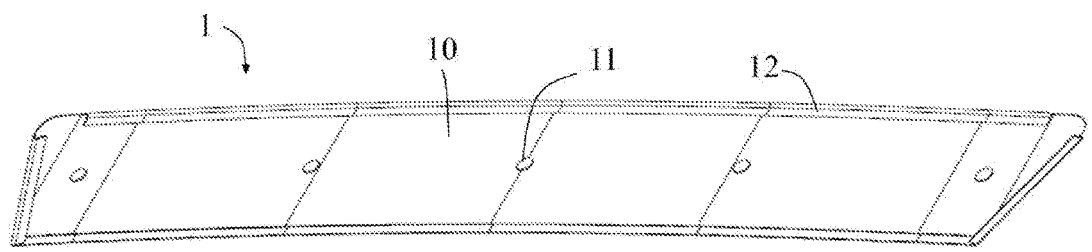
FIG. 5E shows a perspective back view of the guard of FIG. 5A.

An alternative embodiment of guard 1 is shown in FIGS. 5A-5E. As can be seen in FIG. 5A, the guard 1 may have rounded corners 13 and angled sides 10a, 10b. The guard 1 comprises five mounting apertures 11 that are aligned generally horizontally approximately along the center of the guard 1. FIG. 5B shows a bottom view of the guard 1, showing a slight curve in the contour of the guard 1. FIG. 5C shows a back view of the guard 1, showing the hem 12. As can be seen in FIG. 5C, the hem 12 does not extend all the way to the rounded corners 13 but stops some distance short of the corners 13. FIG. 5D shows a side view of the guard 1. FIG. 5E shows a perspective back view of the guard 1.

Because the guard 1 has a frameless structure it is lighter in weight than an otherwise similar guard manufactured with a frame. The lighter weight and need for less material to construct the guard 1 provides cost savings in manufacturing without sacrificing the necessary stiffness and rigidity requirements for the guard 1. The frameless guard 1 also requires fewer manufacturing process steps and is therefore faster and simpler to manufacture than a guard with a frame, providing further savings in manufacturing.

While certain embodiments of the invention have been described, other embodiments may exist. The specific features described above are disclosed as illustrative aspects and embodiments of the invention. Various other aspects, embodiments, modifications, and equivalents thereof which, after reading the description herein, may suggest themselves to one of ordinary skill in the art without departing from the spirit of the present invention or the scope of the claimed subject matter.

What is claimed is:

1. A vehicle radiator guard comprising:
   (a) a main body spanning between a first side, a second side opposite the first side, a third side, and a fourth side opposite the third side, wherein the first, second, third, and fourth sides define an outer perimeter, the main body further defining a plurality of spaced apart openings having a first size, the main body being constructed to allow passage of an air flow stream through the main body openings while preventing passage of objects having a size greater than the first size of the openings;
   (b) a main body outer perimeter extending along each of the first, second, third, and fourth sides of the main body;
   (c) the main body is contoured to correspond to a vehicle grille; and
   (d) a plurality of mounting apertures extending through the main body, each of the plurality of mounting apertures being constructed to receive a fastener for mounting the vehicle radiator guard to a vehicle;
   wherein the vehicle radiator guard is frameless.

2. The vehicle radiator guard of claim 1, wherein the main body comprises metal, plastic, carbon fiber, or a combination thereof.

3. The vehicle radiator guard of claim 1, wherein the main body comprises a wire screen.

4. The vehicle radiator guard of claim 1, wherein the main body comprises a metal wire screen.

5. The vehicle radiator guard of claim 1, further comprising 4 to 10 of the mounting apertures.

6. The vehicle radiator guard of claim 1, wherein the openings of the main body are sized to prevent rocks or debris with a size greater than 4 mm from passing through the vehicle radiator guard.

7. The vehicle radiator guard of claim 1, wherein the openings of the main body are sized to prevent rocks or debris with a size greater than 2.4 mm from passing through the vehicle radiator guard.

8. The vehicle radiator guard of claim 1, further comprising a plurality of fasteners comprising clips constructed to extend through the mounting apertures.

9. The vehicle radiator guard of claim 8, wherein the clips are constructed to mount the guard to a vehicle between a front grille and a radiator within an engine compartment of the vehicle.

10. A vehicle comprising:
    (a) a radiator;
    (b) a grille that allow air to flow to the radiator; and
    (c) a vehicle radiator guard located between the radiator and the grille, wherein the vehicle radiator guard comprises:
       (i) a main body spanning between a first side, a second side opposite the first side, a third side, and a fourth side opposite the third side, wherein the first, second, third, and fourth sides define an outer perimeter, the main body further defining a plurality of spaced apart openings having a first size, the main body being constructed to allow passage of an air flow stream through the main body openings while preventing passage of objects having a size greater than the first size of the openings;
       (ii) a main body outer perimeter extending along each of the first, second, third, and fourth sides of the main body;
       (iii) the main body is contoured to correspond to a vehicle grille; and
       (iv) a plurality of mounting apertures extending through the main body, each of the plurality of mounting apertures being constructed to receive a fastener for mounting the vehicle radiator guard to a vehicle.

11. The vehicle according to claim 10, wherein the main body comprises metal, plastic, carbon fiber, or a combination thereof.

12. The vehicle according to claim 10, wherein the main body comprises a wire screen.

13. The vehicle according to claim 10, wherein the main body comprises a metal wire screen.

14. The vehicle according to claim 10, further comprising 4 to 10 of the mounting apertures.

15. The vehicle according to claim 10, wherein the openings of the main body are sized to prevent rocks or debris with a size greater than 4 mm from passing through the vehicle radiator guard.

16. The vehicle according to claim 10, wherein the openings of the main body are sized to prevent rocks or debris with a size greater than 2.4 mm from passing through the vehicle radiator guard.

17. The vehicle according to claim 10, further comprising a plurality of mounting fasteners, wherein each of the plurality of mounting fasteners comprise a clip extending through a mounting aperture.

18. A vehicle radiator guard comprising:
    a main body spanning between a first side, a second side opposite the first side, a third side, and a fourth side opposite the third side, wherein the first, second, third, and fourth sides define an outer perimeter, the main body further defining a plurality of spaced apart openings having a first size, the main body being constructed to allow passage of an air flow stream through the main body openings while preventing passage of objects having a size greater than the first size of the openings;
    a main body outer perimeter extending along each of the first, second, third, and fourth sides of the main body;
    a plurality of mounting apertures, each of the plurality of mounting apertures being constructed to receive a fastener for mounting the vehicle radiator guard to a vehicle; and
    an opening in the main body configured to allow a vehicle component to pass through the main body;
    wherein the vehicle radiator guard is a self-supporting frameless structure.

19. The vehicle radiator guard of claim 18, wherein the main body comprises a curved contour.

20. The vehicle radiator guard of claim 18, wherein the guard comprises notched corners.

* * * * *